United States Patent [19]
Shoupp et al.

[11] 4,118,717
[45] Oct. 3, 1978

[54] AUTOMATIC FILM-EXPOSURE CONTROL SYSTEM AND ELECTRICAL POWER SUPPLY MEANS FOR A PHOTOGRAPHIC CAMERA

[75] Inventors: William E. Shoupp, Pittsburgh; Walter V. Bratkowski, McKeesport; Dirk J. Boomgaard, Monroeville, all of Pa.

[73] Assignee: Westinghouse Electric Corp., Pittsburgh, Pa.

[21] Appl. No.: 806,118

[22] Filed: Jun. 10, 1977

Related U.S. Application Data

[63] Continuation of Ser. No. 380,178, Jul. 17, 1973, abandoned.

[51] Int. Cl.² .............................................. G03B 7/08
[52] U.S. Cl. .................................. 354/43; 354/60 R; 354/60 F; 354/135; 310/15
[58] Field of Search ...................... 354/43, 60 R, 60 F, 354/135; 310/15, 29

[56] References Cited

U.S. PATENT DOCUMENTS

| | | | |
|---|---|---|---|
| 2,051,061 | 8/1936 | Tonnies | 354/43 |
| 2,491,902 | 12/1949 | Ostline | 310/15 |
| 3,442,194 | 5/1969 | Sho | 354/274 |
| 3,598,030 | 8/1971 | Beach | 354/60 |
| 3,651,748 | 3/1972 | Yoshiada | 354/270 |
| 3,703,132 | 11/1972 | Beach | 354/135 |
| 3,709,118 | 1/1973 | Shoupp et al. | 354/135 |

FOREIGN PATENT DOCUMENTS 2,006,871  9/1971  Fed. Rep. of Germany .......... 354/135

*Primary Examiner*—Russell E. Adams
*Attorney, Agent, or Firm*—D. S. Buleza

[57] ABSTRACT

The "*f*" stop of a camera having a fixed shutter speed is automatically set by a galvanometer type control component that is energized by a mechanically powered electric generator which constitutes an integral part of the camera. The shutter is tripped in predetermined time-delayed sequence relative to tripping of the generator and the latter is automatically recocked along with the shutter when the film is advanced. Precise and reliable dynamic regulation and setting of the "*f*" stop as the picture is being taken is thus achieved without the aid of a battery.

9 Claims, 16 Drawing Figures

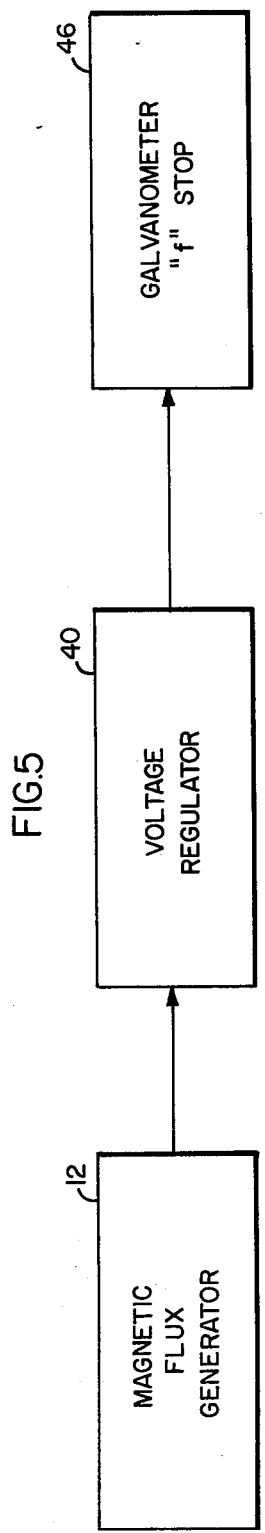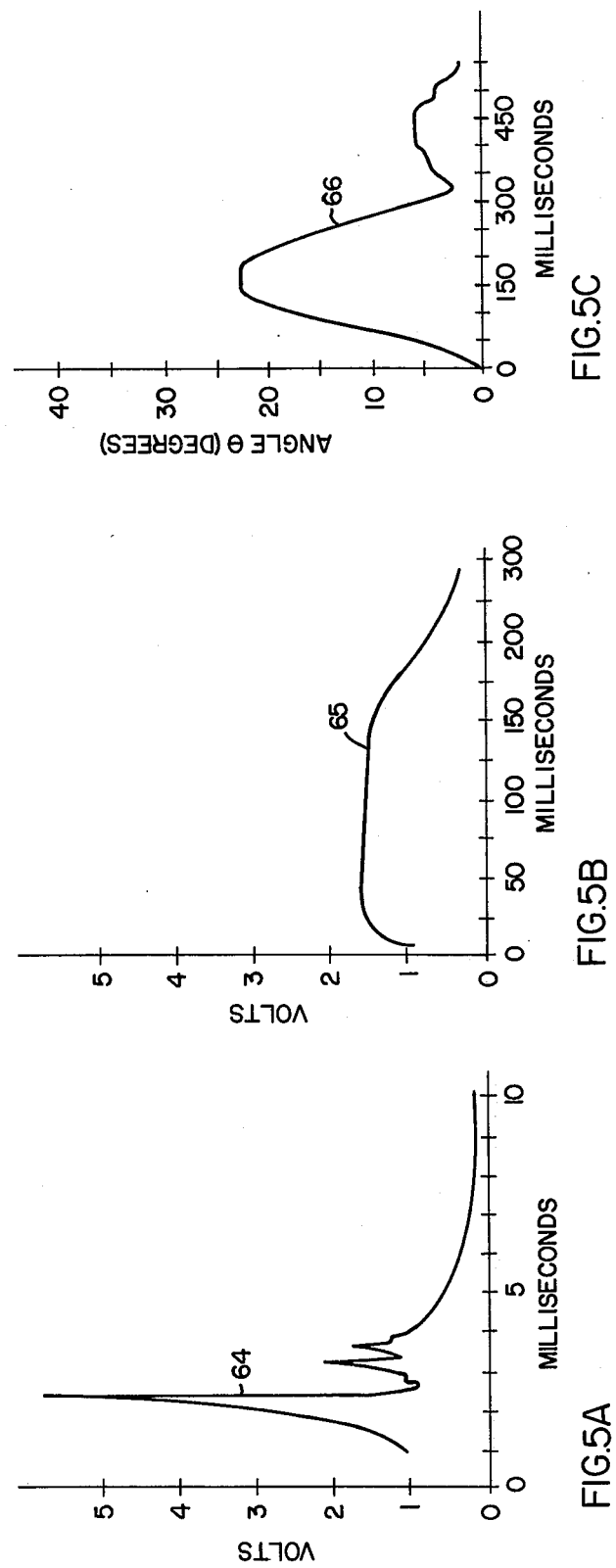

AUTOMATIC FILM-EXPOSURE CONTROL SYSTEM AND ELECTRICAL POWER SUPPLY MEANS FOR A PHOTOGRAPHIC CAMERA

This is a continuation of application Ser. No. 380,178, filed July 17, 1973, now abandoned.

CROSS-REFERENCES TO RELATED APPLICATIONS

The subject matter of this application is related to that disclosed in concurrently filed applications Ser. No. 380,179 and Ser. No. 380,180 of W. E. Shoupp and W. V. Bratkowski, which applications are assigned to the same assignee as this application and have matured into U.S. Pat. Nos. 3,840,297 and 3,842,427, respectively.

BACKGROUND OF THE INVENTION

1. Field of the Invention

This invention relates generally to photographic cameras and has particular reference to an improved system for automatically setting the "$f$" stop of a compact camera during the picture-taking operation.

2. Description of the Prior Art

Photographic cameras having "built-in" devices which automatically control the exposure of the film are well known in the art. For example, "Instamatic" type cameras have been developed which have a fixed shutter speed and a galvanometer type "$f$" stop control mechanism that is electrically powered by a photoelectric cell or a battery inside the camera. In more recent camera designs, such as the type "X" Instamatic cameras now being marketed by the Eastman Kodak Co. that use percussively fired photoflash lamps, a battery is still employed within the camera to energize the "$f$" stop control mechanism.

Similar cameras in which the "$f$" stop or aperture opening is automatically regulated by means of a battery-powered galvanometer system that includes a light-sensitive resistor as part of the control circuit are also known in the art.

The need for a battery in such cameras constitutes a serious drawback and creates problems for the photographer since film exposure will not be properly controlled unless the battery provides the required amount of electrical energy. Hence, a faulty or weak battery would render the "$f$" stop control system inoperative or erratic . . . either of which would result in incorrect exposure of the film. Dirty or oxidized battery contacts would also interfere with the proper operation of the "$f$" stop control system. All of these problems are eliminated by the improved "$f$" stop control and power system of the present invention.

SUMMARY OF THE INVENTION

The foregoing advantages are achieved in accordance with the invention by providing a simple and inexpensive built-in "$f$" stop control and power system for a photographic camera which eliminates the need for batteries and photoelectric cells. The generator need never be recharged and, once installed, requires no maintenance. The system, in general, consists of a magnetic-flux generator, a voltage regulator and a light-sensitive resistor and galvanometer type "$f$" stop regulator component. The magnetic-flux generator and voltage regulator functionally replace the battery and serve as a passive source of electrical energy which is automatically actuated and operates the "$f$" stop control portion of the system when the camera button is pushed. The generator is automatically recocked along with the shutter when the roll of film is advanced after each picture is taken. The reliability of the camera is thus improved since improper "$f$" stop settings due to a weak or faulty battery are inherently prevented. The invention also permits inexpensive cameras to be made which are "batteryless" but still include an automatic exposure control system. Photographers are also spared the task of constantly checking on the state of a battery and the expense of periodically replacing it.

BRIEF DESCRIPTION OF THE DRAWINGS

A better understanding of the invention will be obtained from the exemplary embodiments shown in the accompanying drawings, wherein:

FIG. 5 is a block diagram of the three components which constitute the power supply and "$f$" stop control system;

FIGS. 5A–5C are graphs illustrating the electrical outputs of the first two components of the system and the angular displacement of the galvanometer "$f$" stop regulator component, respectively;

DESCRIPTION OF THE PREFERRED EMBODIMENTS

Figure 1:
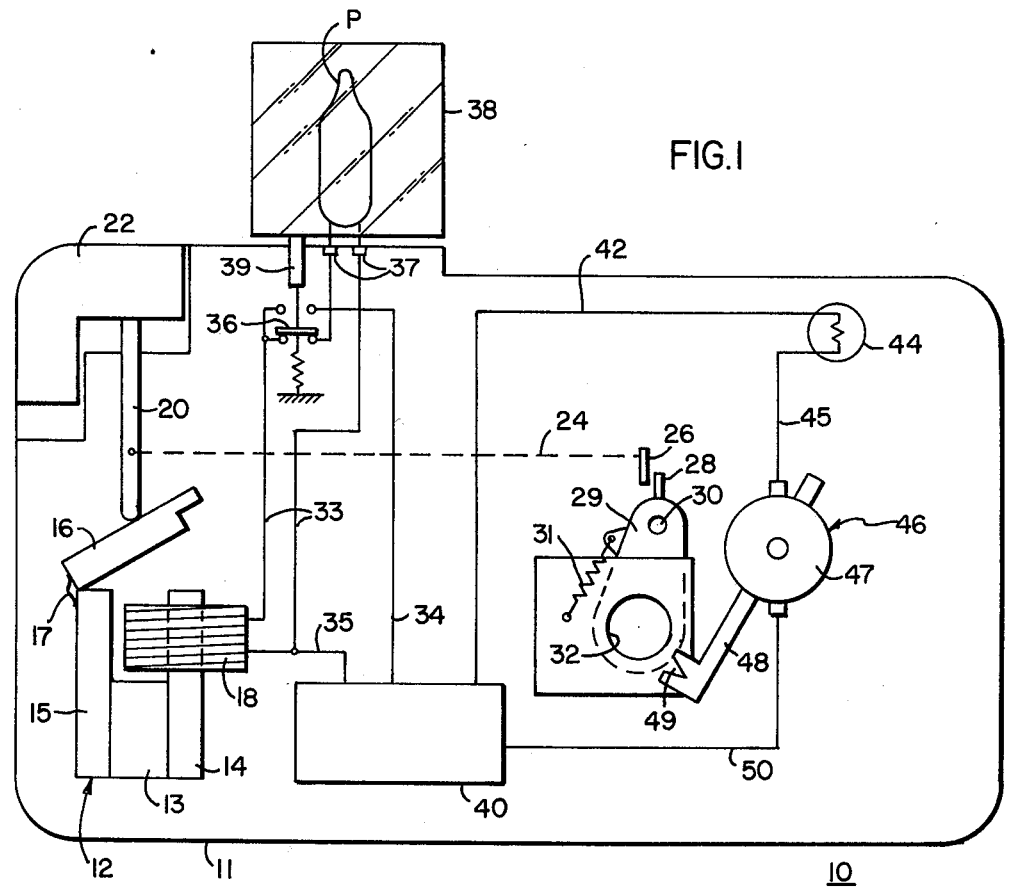
FIG. 1 is a diagrammatic representation of a camera that contains the magnetic flux generator and automatic "$f$" stop control system of the present invention and is fitted with a flashcube.

A photographic "Instamatic" type camera 10 which is fitted with the electric generator and "$f$" stop control system of the present invention is shown in FIG. 1. As illustrated, the camera housing 11 contains a magnetic-flux generator 12 which consists of a permanent magnet 13 and a pair of spaced pole pieces 14 and 15 that define a magnetic circuit in conjunction with a keeper 16 which is hingedly fastened to pole piece 15 by a leaf-spring 17 and is movable toward and away bridging relationship with the pole pieces. A wire coil 18 is disposed on at least one of the pole pieces (pole piece 14 in the drawing) and generates a voltage pulse when the keeper 16 is tripped from its cocked position and rapidly swings into bridging contact with the pole pieces 14 and 15 — thus causing a sudden build-up of the magnetic field. A detailed description of the magnetic-flux generator 12 and the manner in which it generates a pulse of electrical energy is given in the aforementioned concurrently filed application Ser. No. 380,180 (now U.S. Pat. No. 3,842,427).

As will be noted in FIG. 1, the keeper 16 is released from its latched elevated or cocked position by suitable means such as a lever 20 that is attached to the push-button 22 of the camera and moves downwardly with the button when the latter is pressed. The lever 20 is coupled by suitable mechanical-linkage means 24 (indicated by the broken line) to a striker member 26 that hits a tongue 28 on the end of the camera shutter 29 and causes the latter to rotate about a pin 30 against the action of a spring 31 and open the camera aperture 32 for a predetermined period of time before the shutter 29 automatically snaps back to its original position. Such striker and shutter-actuating mechanisms are well known in the art and a representative structure is shown and described in the aforementioned application Ser. No. 380,180 (now U.S. Pat. No. 3,842,427).

Of course, the camera 10 also includes the usual lens, a view finder, a film cartridge compartment and means for indexing the film which are standard components and features of "Instamatic" type cameras but are not shown in FIG. 1. The camera 10 thus has all of the basic features of the camera disclosed in the aforesaid application Ser. No. 380,180 (now U.S. Pat. No. 3,842,427).

As shown in FIG. 1, the output of the magnetic-flux generator 12 is delivered by suitable conductors 33, 34, 35 and a switch 36 to either a photoflash lamp P of a flashcube 38 that is mounted on the camera or to a voltage regulator component 40 that is located within the camera housing 12 adjacent the generator. The flashcube 38 is inserted into a rotatable socket (not shown) that is disposed on top of the camera 10 and sequentially connects the lamps P with a pair of stationary contacts 37 associated with the camera housing 11. When the flashcube 38 is in its inserted position, it depresses a plunger 39 which actuates the spring-loaded switch 36 and automatically connects the generator 12 with the contacts 37 and lamp P as shown. When flashcube 38 is withdrawn, plunger 39 is released and switch 36 automatically connects the generator 12 with the voltage regulator 40, thus converting the camera 10 from its indoor "flash-picture" mode to its outdoor "no-flash" picture mode.

The dynamic "f" stop control system of this invention is thus energized and only operates when flash is not used.

The voltage regulator 40 is connected by a conductor 42 to a light-sensitive resistor 44 which, in turn, is connected by another conductor 45 to an "f" stop control component 46 consisting of a galvanometer device 47 that has a movable regulator arm 48. This arm has a flag-like end segment with a V-shaped notch 49 and is disposed to swing toward and away from the camera aperture 32 when the galvanometer 47 is energized. Galvanometer 47 is connected by another conductor 50 to the voltage regulator 40, thus completing the power and control circuit.

Of course, the light-sensitive resistor 44 is exposed to ambient light by means of a suitable window (not shown) in the camera housing 11 so that it senses the ambient light conditions under which the picture is being taken.

Figure 2:
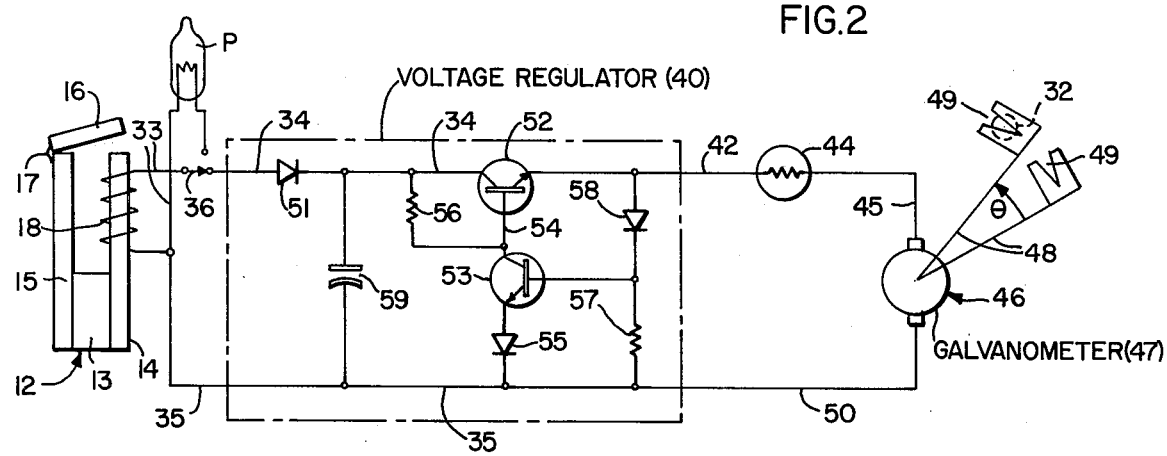
FIG. 2 is a schematic illustration of the generator and "$f$" stop control system employed in the camera shown in FIG. 1.

The dynamic "f" stop control system is shown schematically in FIG. 2. As illustrated, the wire coil 18 of the magnetic-flux generator 12 is connected by conductors 33, 34, 35 and switch 36 to the voltage regulator component 40. One end of coil 18 is connected by conductor 34 to one side of the galvanometer 47 through a diode 51, a transistor 52, conductor 42, and the light-sensitive resistor which are connected in series. The other terminal of the galvanometer 47 is connected to the other end of wire coil 18 by conductors 50 and 35. A second transistor 53 is connected by conductor 54 to the first transistor 52 and to conductor 35 through a second diode 55 in the manner shown. A resistor 56 is connected to conductor 34 (at a point between diode 51 and transistor 52) and to conductor 54 that connects the two transistors 52 and 53. A second resistor 57 is connected to another diode 58 and to transistor 53 in the manner indicated. A capacitor 59 is connected in parallel relationship with the wire coil 18 at a point on conductor 34 between diode 51 and resistor 56 and at a point on conductor 35 located between the coil 19 and the point on conductor 35 at which diode 55 is connected.

All of the aforesaid elements of the voltage regulator 40 are arranged and connected in such a way that they form a miniaturized circuit that is mounted at a suitable location within the camera housing 11.

Thus, when the film-advance and shutter-cocking mechanisms of camera 10 cocks the keeper 16 of the generator 12 mechanical energy is stored in the generator. When button 22 of the camera 10 is pushed to take a picture, keeper 16 is released and the magnetic force pulls the keeper shut into bridging position and contact with the pole pieces 14 and 15. This action generates a pulse of electric current in coil 18, which current is fed to the voltage regulator 40. In the voltage regulator 40 the current pulse passes through diode 51 into the capacitor 59 which acts as an electric energy storage device. Diode 51 prevents the capacitor 59 from being discharged back into the coil 18 when the keeper 16 reaches its closed position and the current flow stops. Capacitor 59 discharges through the regulator circuit and the resulting stabilized voltage is fed into the light-sensitive resistor 44 and the galvanometer 47 through conductors 42, 45 and 50.

The voltage regulator 40 maintains a constant voltage across the light-sensitive resistor 44 and the galvanometer 47 during the time when the lens and aperture 32 of the camera 10 are open. Hence, the position of the galvanometer coil (not shown) and the "f" stop regulator arm 48, which are coupled together and swing as a unit, is determined by the current which flows through the galvanometer coil. This current is determined by the resistivity of the light-sensitive resistor 44 which, in turn, is controlled by the available or ambient light at that point in time. Thus, the "f" stop setting will only be dependent upon the ambient light conditions.

Figures 3A, 3B:
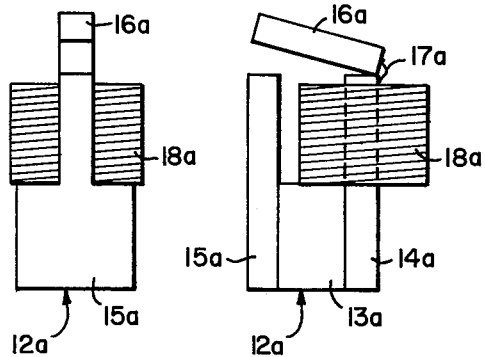
FIGS. 3A and 3B are side and front elevational views, respectively, of one form of magnetic-flux generator according to the invention.
Figure 3C:
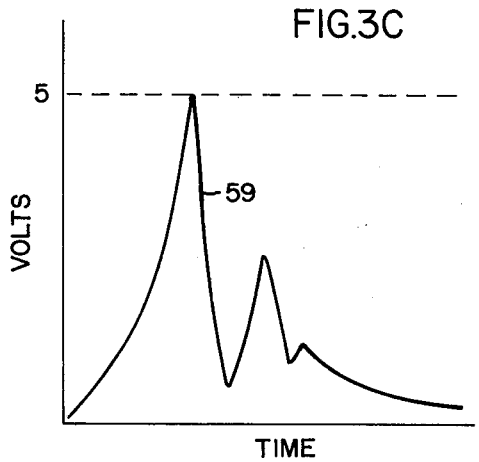
FIG. 3C is a graph illustrating the voltage pulse produced by the generator shown in FIGS. 3A and 3B.

In FIGS. 3A and 3B there is shown one form of magnetic-flux generator 12a having pole pieces 14a, 15a and a keeper 16a that are constructed of solid ferromagnetic material. This type generator, when tripped, caused the coil 18a to produce a peak open circuit voltage of around 5 volts, as shown by curve 59 in FIG. 3C.

Figures 4A, 4B:
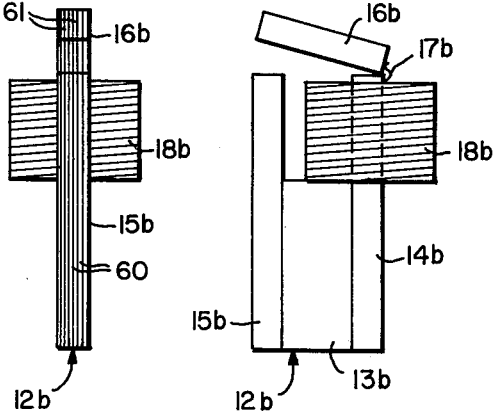
FIGS. 4A and 4B are similar views of an alternative generator embodiment.
Figure 4C:
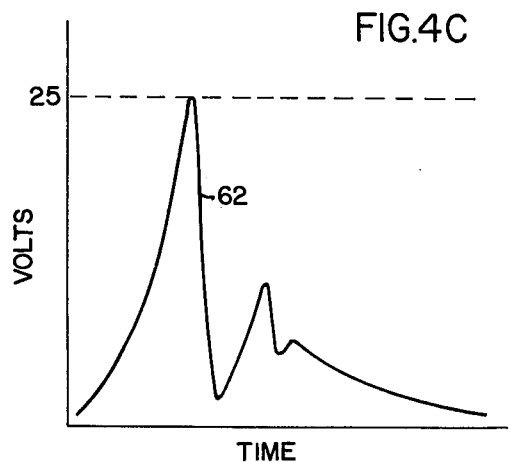
FIG. 4C is a graph of the voltage pulse produced by the aforementioned alternative form of generator.

In an alternative generator 12b shown in FIGS. 4A and 4B the pole pieces 14b and 15b are fabricated from a plurality of separate laminations 60 and keeper 16b is made from similar laminations 61. This laminated construction reduced losses in the magnetic circuit by an amount such that a peak open circuit voltage of approximately 25 volts (curve 62 in FIG. 4C) was produced by the coil 18b when the keeper 16b was tripped.

The basic components of the power supply and "$f$" stop control system consist of the magnetic-flux generator 12, the voltage regulator 40 and the galvanometer "$f$" stop component 46, as shown in FIG. 5. A prototype generator of modified "solid-piece" construction produced a voltage pulse 64 (FIG. 5A) that was about 5 or 6 milliseconds long and reached the peak value of almost 6 volts about 1 millisecond after the generator was tripped. As shown in FIG. 5B, the voltage regulator 40 converted the short voltage pulse 64 produced by the generator 12 into a more stabilized pulse 65 of a lower value but longer duration. As will be noted, the stabilized pulse 65 has a fairly constant value of around 1.5 volts from about 10 milliseconds to 170 milliseconds, or a period of 160 milliseconds.

When voltage pulse 65 was fed into the galvanometer "$f$" stop component 46 the regulator arm 48 swung through an angle $\theta$ in the manner depicted by curve 66 in FIG. 5C. Under the normal room-light conditions in which this test was conducted, it will be seen that the regulator arm 48 was rapidly swung through an angle of approximately 23° in about 130 milliseconds, remained motionless at that position for about 50 milliseconds and then returned to its approximate original position in about 140 milliseconds (320 milliseconds total elapsed time). Thus, the regulator arm 48 of the galvanometer "$f$" stop control component 46 remained motionless for approximately 50 milliseconds at an angular displacement of around 23° in this particular test.

Of course, the angular displacement of the regulator arm 48 must be correlated with the location and size of the camera aperture 32 if proper control of the light striking the film and good pictures are to be obtained. This, in turn, requires that the electrical characteristics and output of the voltage regulator 40 be properly correlated with the electrical characteristics (resistance, etc.) of the galvanometer coil and mechanical design of the galvanometer arm 40 and notch 49. The test data shown in FIGS. 5A through 5C were obtained using the "$f$" stop control system of an Argus "Electric Eye Instant Load" Model 345 X camera and a generator 12 and voltage regulator 40 that produced the voltage pulses depicted by curves 64 and 65, respectively. The charge capacitor 59 had a value of 10 microfarads, resistor 56 a value of 51,000 ohms, and resistor 57 a value of 12,000 ohms. Transistors 52 and 53 were identical and were well-known type "2N2222" transistors. Diode 51 was a type "1N643" diode, diode 55 was a type "1N995" diode, and diode 58 was a type "1N961B" diode. Diodes of this type are also well-known in the art.

Figure 6:
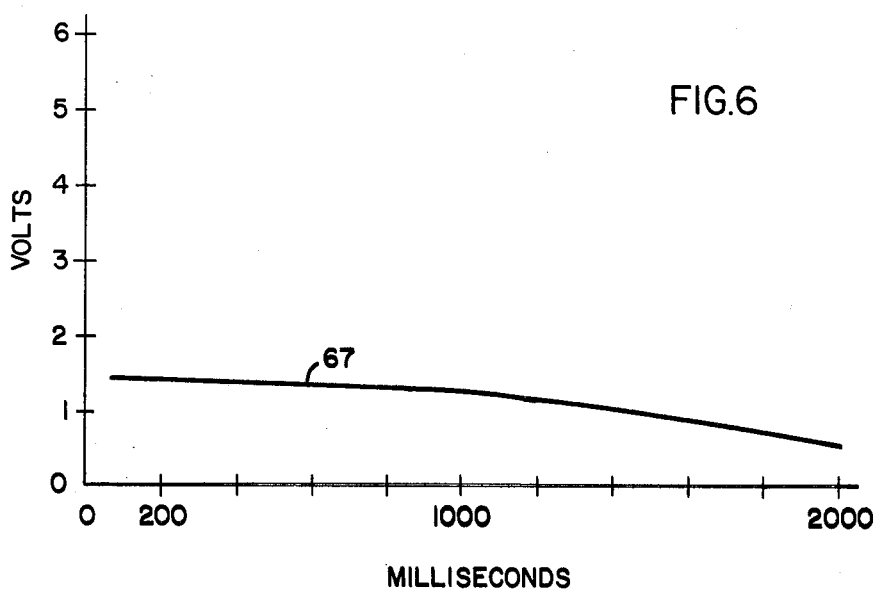
FIG. 6 is a graph illustrating the stabilized voltage output of the power supply obtained with the laminated-type generator shown in FIGS. 4A and 4B and a high resistance load.

A second series of tests using the above-described regulator circuit and "$f$" stop control system of the above-identified Argus camera were conducted in order to increase the "dwell time" of the output voltage across the galvanometer 47. In this test, the laminated type magnetic flux generator 12b shown in FIGS. 4A and 4B was used and the capacitance of the voltage charge capacitor 59 was increased to 110 microfarads. This was the only change made in the voltage regulator 40. The output of the voltage regulator in this test under normal room-lighting conditions is shown graphically in FIG. 6. As will be noted, the voltage pulse 67 was much flatter than before and remained substantially constant at a value of about 1.3 volts for over 1000 milliseconds or 1 second.

Of course, if the ambient light conditions are such that a large amount of light will pass through the lens and impinge upon the film in a given period of time, then the camera aperture 32 must be constricted to a proportionately greater degree than when the ambient light level is low. The 23° angular displacement of the regulator arm 48 of the galvanometer 47 depicted by curve 66 in FIG. 5C occurred under normal room-lighting conditions. Under bright light conditions, the regulator arm 48 was displaced through an angle of approximately 40°.

Figure 7:
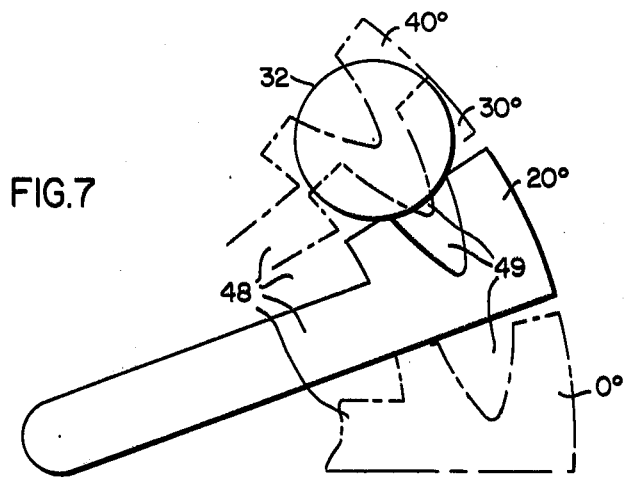
FIG. 7 is an enlarged plan view of the regulator element of the galvanometer component illustrating the manner in which it controllably constricts the camera aperture.

The manner in which the angular displacement of the regulator arm 48 and the position of the notch 49 in its flag-shaped end is correlated with the camera aperture 32 is shown in FIG. 7. As will be noted, at an angular displacement of 20° the leading edge of the arm 48 is aligned with the adjacent edge of the aperture 32. At an angular displacement of 30° the leading edge of the arm 48 coincides with the center line of the aperture 32 and at an angular displacement of 40° the leading edge of the arm 48 extends slightly past the far edge of the aperture 32. Thus, the notch 49 in the end of the regulator arm 48 controls the opening of the aperture or "$f$" stop setting of the camera 10 and constricts the camera aperture 32 in precisely regulated fashion, depending upon the angular displacement of the arm 48 and the ambient light conditions.

The angular displacement of the "$f$" stop regulator arm 48 versus time under the two different lighting conditions mentioned above is shown graphically in FIG. 8. Curve 66 represents the 23° displacement obtained under normal room-lighting conditions and is identical to the displacement curve shown in FIG. 5C. Curve 68 depicts the angular displacement of the arm 48 under bright light conditions and shows that the arm was rapidly swung through an angle $\theta$ of slightly over 40°, remained at this position for about 20 milliseconds, and returned to about its approximate original position — all within a period of about 240 milliseconds. Curve 70 depicts an angular displacement of about 30° and a longer dwell time (about 50 milliseconds) which occur at a lighting level midway between normal room light and bright light conditions. Line 71 is the "20° reference point" at which the leading edge of the control arm 48 just reaches the near edge of the camera aperture 32.

Figure 8:
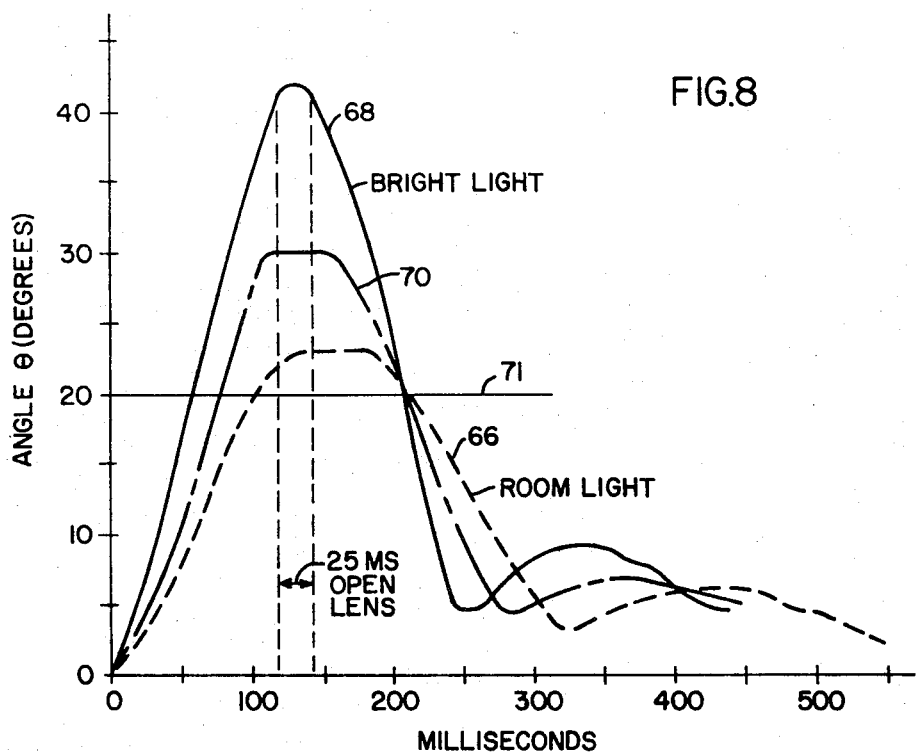
FIG. 8 is a graph illustrating the angular displacement of the "$f$" stop regulating element under various ambient light conditions.

As indicated in FIG. 8, the particular type of Argus camera employed in obtaining the data had a shutter mechanism which opened the lens for approximately 25 milliseconds and that this was delayed about 115 milliseconds from the time the regulator arm 48 of the galvanometer "$f$" stop component 46 began to move. FIG. 8 thus shows that by introducing a mechanical delay of about 115 milliseconds between the tripping of the camera shutter 29 and the tripping of the magnetic-flux generator 12 the shutter 29 will be in its "open-lens" position when the regulator arm 48 of the galvanometer "$f$" stop component 46 is at its "dwell" or stationary position. The "$f$" stop opening of the camera 10 is, accordingly, automatically and dynamically regulated by the integral electric power and "$f$" stop control system of the present invention.

Thus the "$f$" stop is set and in position when the shutter opens and the picture is taken.

Figure 9:
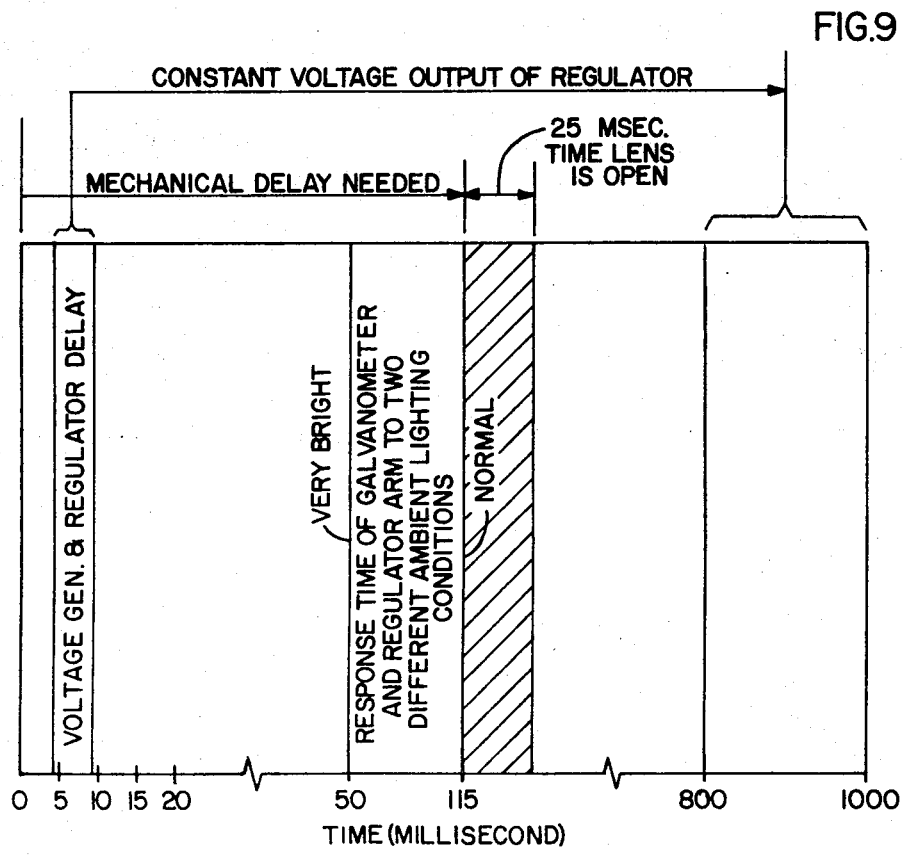
FIG. 9 is a time chart showing the manner in which the operation of the various components of the system are synchronized with the opening of the camera aperture by the shutter.

The chart in FIG. 9 shows the sequential operations of the magnetic-flux generator 12, the voltage regulator 40 and the "f" stop control component 46 versus time and the manner in which they are synchronized with the opening of the camera lens. As will be noted, there is a 115 millisecond mechanical delay between the tripping of the generator 12 (0 milliseconds) and the time at which the shutter 29 begins to open the lens (115 milliseconds). After tripping of the generator 12, the generated voltage pulse is fed into the voltage regulator 40 and about 5 milliseconds later the constant voltage output of the regulator is fed into the galvanometer 47. Under very bright ambient light conditions, the regulator arm 48 of the galvanometer component 46 moves rapidly and starts to change the "f" stop in about 50 milliseconds after the generator 12 is tripped. Under low or "normal room" lighting conditions, the arm 48 moves slower and does not start changing the "f" stop until 100 milliseconds after the generator 12 is tripped. However, in both cases, the regulator arm 48 is in position and regulates the camera aperture 32 during the 25 millisecond period that it and the lens are opened by the shutter 29 (indicated by the shaded portion of the graph).

If it is desirable to have less time delay between tripping of the electric generator 12 and tripping of the shutter 29, then the frequency response of the galvanometer 47 can be increased in a manner well known to those skilled in the galvanometer art. Preliminary studies indicate that the state of the galvanometer art is such that the frequency response of the galvanometer can be increased by an order of magnitude.

We claim as our invention:

1. In combination with a photographic camera having an aperture and a shutter that is moved from an aperture-closed position to an aperture-open position by a shutter-actuating mechanism to expose film within the camera, a system for controlling the film exposure under various ambient light conditions and means for energizing and operating said exposure-control system comprising:

a mechanically actuable electric generator having (a) means which defines a magnetic circuit, (b) a component that is movable along a predetermined path which produces a concomitant change in the field strength of said magnetic circuit, and (c) conductor means disposed in inductive relationship with the field of said magnetic circuit and adapted, in response to the actuation of said electric generator and the movement of said component along said path, to produce a group of voltage pulses of varying magnitudes and durations with the initial voltage pulse being of the longest duration and having a peak value greater than any of the other voltage pulses, means for mechanically actuating said electric generator and the movable component thereof, electric circuit means operable to convert the voltage pulses produced by the actuated electric generator into a voltage which is of smaller magnitude than said initial voltage pulse and is substantially maintained at a predetermined value for a period of time longer than the duration of said initial voltage pulse, conductor means connecting the electric generator with said voltage-conversion circuit means, means for controllably constricting the camera aperture, when the shutter is in its aperture-open position, comprising a light-sensitive electrical component and a galvanometer device that is electrically coupled to said light-sensitive component and has a movable elongated member which swings toward the camera aperture when the galvanometer device is energized and swings away from the camera aperture to a rest position when the galvanometer device is de-energized, said movable elongated member constituting an integral part of and being directly actuated by the galvanometer device, conductor means electrically connecting the voltage-conversion circuit means to said light-sensitive component and galvanometer device, said light-sensitive component being disposed at a location such that it is exposed to and senses ambient light and is operable thereby to control the amount of electric current flow through the galvanometer device and regulate the displacement of the movable elongated member, when the galvanometer device is energized, and thus the size of the aperture opening and the resulting film exposure.

2. The combination of claim 1 wherein said electric generator is mechanically coupled to the shutter-actuating mechanism of the camera.

3. The combination of claim 2 wherein said camera includes a depressible component which, when actuated, initiates the operation of said shutter-actuating mechanism and the electric generator.

4. The combination of claim 1 wherein the movable elongated member which constitutes a part of the galvanometer device comprises an arm-like element that is swung through an arc by the galvanometer device.

5. The combination of claim 4 wherein said arm-like element has a segment with a notched profile which coacts with the camera aperture to control the aperture size and film exposure.

6. The combination of claim 1 wherein said light-sensitive electrical component comprises a light-sensitive resistor.

7. The combination of claim 1 wherein:
said magnetic circuit includes a permanent magnet and a pole piece, and
the movable component of said electric generator moves along a predetermined path relative to said pole piece when the electric generator is actuated.

8. The combination of claim 7 wherein the pole piece and movable component of said electric generator each consist of a solid piece of ferromagnetic material.

9. The combination of claim 7 wherein the pole piece and movable component of said electric generator each consist of a plurality of thin sheets of ferromagnetic material that are disposed in laminated relationship.

* * * * *